US010006367B2

(12) United States Patent
Romanov et al.

(10) Patent No.: US 10,006,367 B2
(45) Date of Patent: Jun. 26, 2018

(54) SELF-OPENING COOLING PASSAGES FOR A GAS TURBINE ENGINE

(71) Applicant: United Technologies Corporation, Hartford, CT (US)

(72) Inventors: Dmitriy A. Romanov, Wells, ME (US); Mark F. Zelesky, Bolton, CT (US)

(73) Assignee: United Technologies Corporation, Farmington, CT (US)

(*) Notice: Subject to any disclaimer, the term of this patent is extended or adjusted under 35 U.S.C. 154(b) by 800 days.

(21) Appl. No.: 14/216,014

(22) Filed: Mar. 17, 2014

(65) Prior Publication Data

US 2016/0160760 A1 Jun. 9, 2016

Related U.S. Application Data

(60) Provisional application No. 61/793,221, filed on Mar. 15, 2013.

(51) Int. Cl.

| | |
|---|---|
| ***F02C 7/12*** | (2006.01) |
| ***F02C 7/18*** | (2006.01) |
| ***F01D 11/12*** | (2006.01) |
| ***F01D 11/24*** | (2006.01) |
| ***F01D 9/06*** | (2006.01) |
| ***F01D 25/08*** | (2006.01) |
| ***F01D 25/12*** | (2006.01) |
| ***F01D 5/18*** | (2006.01) |

(52) U.S. Cl.

CPC .............. *F02C 7/18* (2013.01); *F01D 11/122* (2013.01); *F05D 2240/11* (2013.01); *F05D 2260/20* (2013.01); *Y02T 50/676* (2013.01)

(58) Field of Classification Search

CPC .... F02C 7/18; F02C 7/185; F02C 7/12; F01D 11/122; F01D 11/24; F01D 9/06; F01D 25/08; F01D 25/12; F01D 5/182; F01D 5/183; F01D 5/186; F01D 5/187; F05D 2240/11; F05D 2260/20

USPC .................................. 60/772, 752, 782, 785

See application file for complete search history.

(56) References Cited

U.S. PATENT DOCUMENTS 5,027,604 A * 7/1991 Krueger .................. F01D 5/187 415/9
5,752,802 A * 5/1998 Jones ........................ F01D 5/20 415/170.1
6,077,035 A * 6/2000 Walters ................... F01D 5/081 415/115
7,241,107 B2 * 7/2007 Spanks, Jr. ............. F01D 5/186 29/889.721
7,306,424 B2 * 12/2007 Romanov ............... F01D 11/08 415/115
7,553,128 B2 * 6/2009 Abdel-Messeh ........ F01D 5/187 415/116
7,597,533 B1 * 10/2009 Liang ........................ F01D 9/02 415/116
7,650,926 B2 * 1/2010 Tholen ...................... B22C 9/04 164/35
7,665,962 B1 * 2/2010 Liang ...................... F01D 11/24 415/115

(Continued)

*Primary Examiner* — Bayan Salone
(74) *Attorney, Agent, or Firm* — O'Shea Getz P.C.

(57) ABSTRACT

A turbine component for a gas turbine engine includes a multiple of self-opening cooling passages each of which defines a self-opening cooling passage axis that extends through a gas path surface.

11 Claims, 9 Drawing Sheets

S 102 100 64 104 P 110 C

(56) References Cited

U.S. PATENT DOCUMENTS

| | | | | |
|---|---|---|---|---|
| 7,686,068 | B2 * | 3/2010 | Tholen | B22C 9/04 164/35 |
| 7,704,039 | B1 * | 4/2010 | Liang | F01D 9/04 415/116 |
| 7,874,792 | B2 * | 1/2011 | Tholen | B22C 9/10 415/115 |
| 7,959,407 | B2 * | 6/2011 | Tholen | B22C 9/04 415/115 |
| 7,980,820 | B2 * | 7/2011 | Gayman | F01D 5/20 416/228 |
| 8,061,979 | B1 * | 11/2011 | Liang | F01D 11/08 415/173.1 |
| 8,118,547 | B1 * | 2/2012 | Liang | F01D 11/10 415/116 |
| 8,763,402 | B2 * | 7/2014 | Xu | F01D 5/186 60/752 |
| 8,998,572 | B2 * | 4/2015 | Lutjen | F04D 29/164 415/173.1 |
| 2004/0226682 | A1 * | 11/2004 | Ehrhard | F01D 5/18 165/11.1 |
| 2005/0111966 | A1 * | 5/2005 | Metheny | F01D 5/183 415/116 |
| 2006/0263217 | A1 * | 11/2006 | Spanks, Jr. | F01D 5/186 416/97 R |
| 2011/0129342 | A1 * | 6/2011 | Smoke | F01D 5/087 416/95 |
| 2011/0189015 | A1 * | 8/2011 | Shepherd | F01D 5/186 416/95 |
| 2014/0099183 | A1 * | 4/2014 | Morgan | F01D 5/18 415/1 |

* cited by examiner

A
20
28
46
38
38
54
62
56
50
26
32
36
30
52
62
24
44
40
38
22
42
48
38

SELF-OPENING COOLING PASSAGES FOR A GAS TURBINE ENGINE

This application claims priority to U.S. Patent Appln. No. 61/793,221 filed Mar. 15, 2013.

BACKGROUND

The present disclosure relates to a gas turbine engine and, more particularly, to a cooling arrangement therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section produces a circumferential temperature pattern referred to as a pattern factor that results in hot and cold streaks in the turbine section. Stationary components such as stationary vane arrays and Blade Outer Air Seals operate at the local pattern temperature and are thereby designed to withstand the local max temperature hot streaks which typically requires significantly higher dedicated cooling flow rates than rotational components such a blade arrays.

SUMMARY

A turbine component for a gas turbine engine according to one disclosed non-limiting embodiment of the present disclosure includes a gas path surface carried by the turbine component; and a self-opening cooling passage defined by the turbine component and communicating through the gas path surface when at least partially opened.

In a further embodiment of the present disclosure, the self-opening cooling passage includes a barrier that burns away in response to a hot streak.

In a further embodiment of any of the foregoing embodiments of the present disclosure, the self-opening cooling passage includes a barrier which burns away in response to a predetermined temperature to open the self-opening cooling passages.

In a further embodiment of any of the foregoing embodiments of the present disclosure, the barrier is defined by a thermal barrier coating.

In a further embodiment of any of the foregoing embodiments of the present disclosure, the self-opening cooling passage is defined by a slot with a metal alloy sheet to enclose the slot.

In a further embodiment of any of the foregoing embodiments of the present disclosure, the metal alloy sheet defines a barrier that burns away in response to a predetermined temperature to open the self-opening cooling passage.

In a further embodiment of any of the foregoing embodiments of the present disclosure, the metal alloy sheet defines a barrier that burns away in response to a heat streak to open the self-opening cooling passage.

In a further embodiment of any of the foregoing embodiments of the present disclosure, the self-opening cooling passage is a non-through passage.

In a further embodiment of any of the foregoing embodiments of the present disclosure, each of the non-through passages is displaced from a gas path surface by a predefined thickness of material that burns away in response to a predetermined temperature to open the self-opening cooling passage.

In a further embodiment of any of the foregoing embodiments of the present disclosure, the non-through passages are displaced from a gas path surface by a predefined thickness of material that burns away in response to a heat streak to open a respective self-opening cooling passage.

In a further embodiment of any of the foregoing embodiments of the present disclosure, the turbine component is a blade outer air seal.

In a further embodiment of any of the foregoing embodiments of the present disclosure, the turbine component is an inner vane support.

In a further embodiment of any of the foregoing embodiments of the present disclosure, the static turbine component is an outer vane support.

A turbine component for a gas turbine engine according to another disclosed non-limiting embodiment of the present disclosure includes a multiple of self-opening cooling passages each of which defines a self-opening cooling passage axis that extends through a gas path surface.

In a further embodiment of any of the foregoing embodiments of the present disclosure, each of the multiple of self-opening cooling passages includes a barrier that burns away in response to a hot streak.

In a further embodiment of any of the foregoing embodiments of the present disclosure, the turbine component is a blade outer air seal.

A method of providing local film cooling in a gas turbine engine, according to another disclosed non-limiting embodiment of the present disclosure includes opening at least one of a plurality of self-opening cooling passages in response to a heat streak.

A further embodiment of any of the foregoing embodiments of the present disclosure includes burning away a barrier in response to a predetermined temperature to open at least one of the plurality of self-opening cooling passages.

A further embodiment of any of the foregoing embodiments of the present disclosure includes burning away a barrier to open at least one of the plurality of self-opening cooling passages.

A further embodiment of any of the foregoing embodiments of the present disclosure includes utilizing a predefined thickness of a material of the turbine component as the barrier.

A further embodiment of any of the foregoing embodiments of the present disclosure includes utilizing a sheet of metal alloy as the barrier.

A further embodiment of any of the foregoing embodiments of the present disclosure includes locating the plurality of self-opening cooling passages between a secondary airflow and a core airflow.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
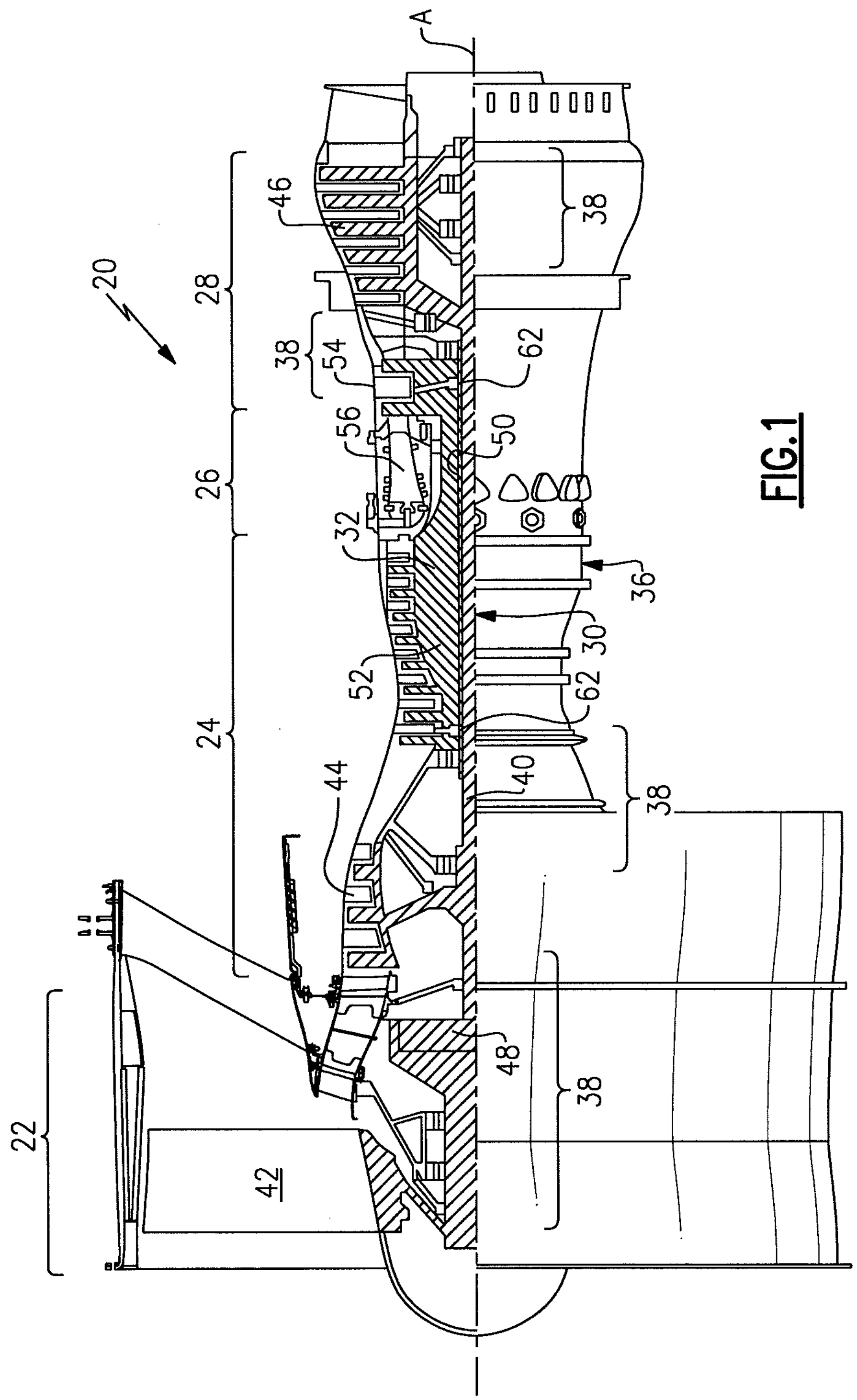
FIG. 1 is a schematic cross-section of one example aero gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, industrial gas turbines, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 46, 54 rotationally drive the respective low spool 30 and high spool 32 in response to the expansion. The main engine shafts 40, 50 are supported at a plurality of points by bearing compartments 38 within the case structure 36. It should be appreciated that various bearing apartments 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one example, a significant amount of thrust is provided by the bypass airflow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(\text{"T"}/518.7)^{0.5}$. The Low Corrected Fan Tip Speed according to one non-limiting embodiment of the example gas turbine engine 20 is less than about 1150 fps (351 m/s).

Figure 2:
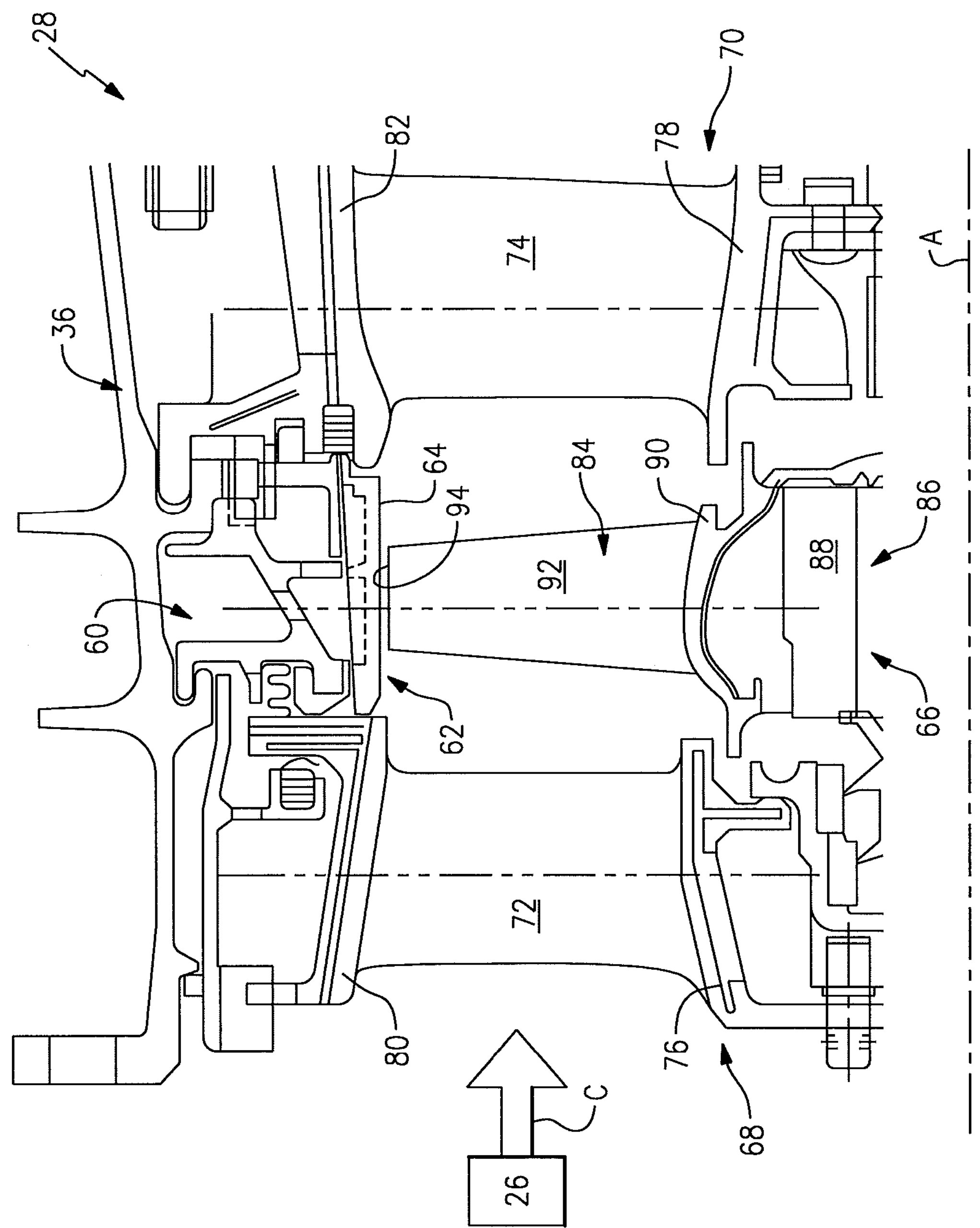
FIG. 2 is an enlarged schematic cross-section of a turbine section with a blade outer air seal (BOAS) assembly according to one disclosed non-limiting embodiment.

With reference to FIG. 2, an enlarged schematic view of a portion of the turbine section 28 is shown by way of example; however, other engine sections will also benefit herefrom. A shroud assembly 60 within the engine case structure 36 at least partially supports a blade outer air seal (BOAS) assembly 62 with a multiple of BOAS segments 64 proximate to a turbine blade rotor assembly 66 (one schematically shown). It should be appreciated that the shroud assembly 60 may be circumferentially segmented or otherwise configured to receive and retain the multiple of BOAS segments 64.

The shroud assembly 60 and the blade outer air seal (BOAS) assembly 62 are axially disposed between a forward stationary vane assembly 68 and an aft stationary vane assembly 70. Each vane assembly 68, 70 includes an array of vanes 72, 74 (one shown) that extend between a respective inner vane support 76, 78 and an outer vane support 80, 82. The outer vane supports 80, 82 are attached to the engine case structure 36.

The rotor assembly 66 includes an array of blades 84 (one shown) circumferentially disposed around a disk 86. Each blade 84 includes a root 88, a platform 90 and an airfoil 92. The blade roots 88 are received within a rim 92 of the disk 86 and the airfoils 92 extend radially outward such that a tip 94 of each airfoil 92 is closet to the blade outer air seal (BOAS) assembly 62.

Combustion gases produced in the combustor section 26 (indicated schematically by arrow C) expand in the turbine section 28 and produce pressure gradients, temperature gradients and vibrations. The BOAS segments 64 are supported with respect to the shroud assembly 60 to provide for relative movement to accommodate the expansion caused by changes in pressure, temperature and vibrations encountered during operation of the gas turbine engine 20. The combustion gases C also produce a circumferential temperature pattern referred to as a pattern factor that results in hot streaks and cold streaks around the circumference of the turbine section 28 proximate the BOAS segments 64, inner vane supports 76, 78 and outer vane supports 80, 82. The BOAS segments 64, the inner vane support 76, 78, the outer vane support 80, 82 and other rotationally fixed components in the turbine section 28 are defined herein as static turbine component 98 exposed to relatively constant hot streaks and cold streaks due to the pattern factor.

Figure 3:
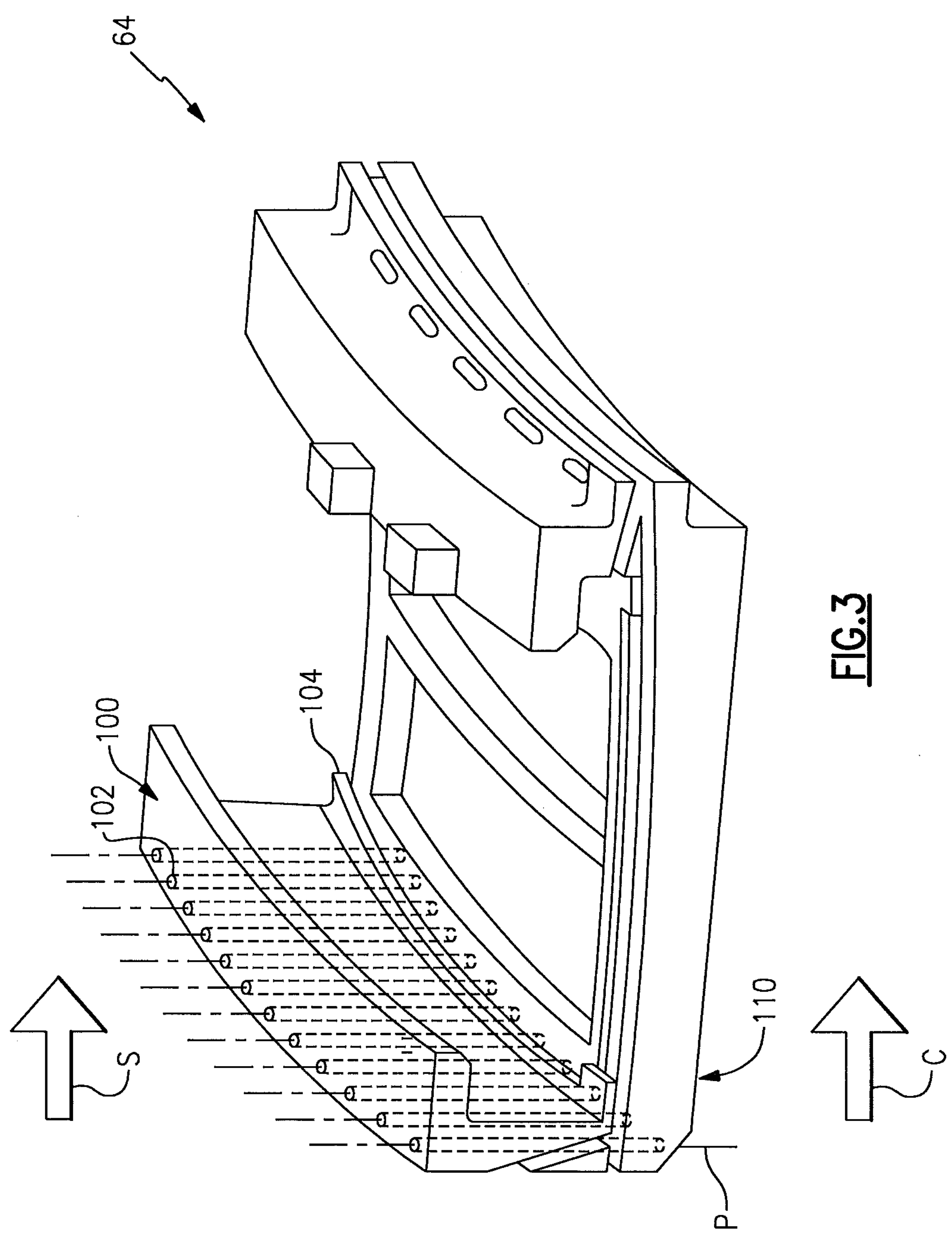
FIG. 3 is a cold side perspective view of a blade outer air seal (BOAS) segment having a multiple of self-opening cooling passages illustrated in phantom.

With reference to FIG. 3, each BOAS segment 64 includes a multiple of self-opening cooling passages 100 through which secondary airflow may be communicated to provide cooling thereof. Although a BOAS segment 64 is illustrated as representative of static turbine component 98, it should be appreciated that various types of static turbine component 98 such as the aforementioned example inner vane support 76, 78, outer vane support 80, 82 and other rotationally fixed components also include a multiple of the self-opening cooling passages 100 and will benefit herefrom.

The multiple of self-opening cooling passages 100 provide generally radially directed flow passages between a core airflow C in the core flowpath and a secondary airflow C in a secondary flowpath. The secondary airflow may be utilized for a multiple of purposes to include, for example, cooling and pressurization. The secondary airflow as defined herein may be any airflow different from the core airflow and may include third stream and other airflows of a variable cycle Adaptive Engine Technology engine architecture which power aircraft over a range of operating conditions yet achieve countervailing objectives such as high specific thrust and low fuel consumption through an adaptable flow.

Figure 4:
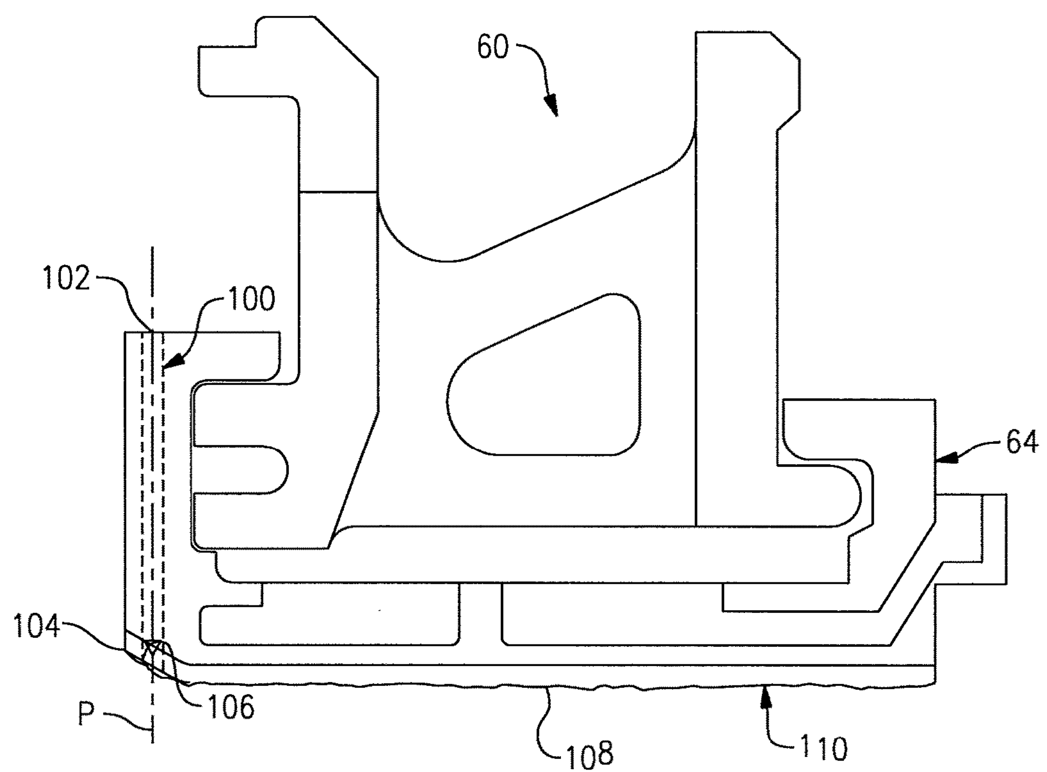
FIG. 4 is a sectional view of a shroud assembly with a blade outer air seal (BOAS) segment having a multiple of self-opening cooling passages according to one disclosed non-limiting embodiment.

With reference to FIG. 4, each of the multiple of self-opening cooling passages are defined about an axis P that extends through a gas path surface 110. Each of the multiple of self-opening cooling passages 100 are initially manufactured to have an inlet 102 and an exit 104 closed by a barrier 106. In one disclose non-limiting embodiment, the barrier 106 is defined by a thermal barrier coating 108 (FIG. 4). That is, the thermal barrier coating 108 is applied over the multiple of self-opening exits 104 such that the multiple of self-opening cooling passages 100 are closed by the thermal barrier coating 108 that operate as the barrier 106 on gas path surface 110 exposed to the hot streaks and cold streaks. It should be appreciated that various coating and combinations thereof may be utilized as the thermal barrier coating 108.

Figure 5:
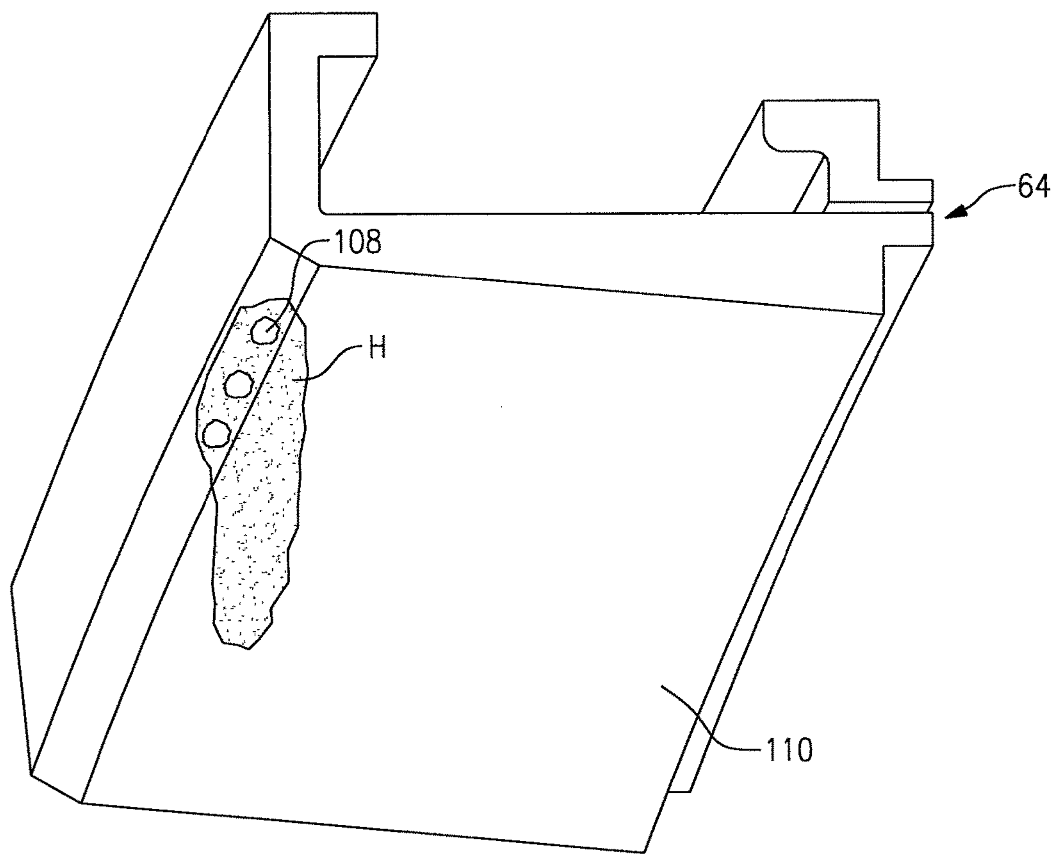
FIG. 5 is a hot side perspective view of a blade outer air seal (BOAS) segment with self-opening cooling passages opened in response to a heat streak.

Under standard engine operation at about a nominal average temperature environment, the thermal barrier coating 108 operates as the barrier 106 for the multiple of self-cooling passages 100. However, should one or more of the multiple of self-opening cooling passages 100 be subjected to a hot streak H of the pattern factor (FIG. 5), the local increased temperature of the hot streak burns away the barrier 106 in those particular one or more cooling passages 100 to open those particular one or more self-cooling passages 100. Those particular one or more cooling passages 100 are thereby opened to communicate a secondary cooling flow therethrough which operates to film cool the localized area of the hot streak as well as convection cool the adjacent area of the static turbine component 98.

That is, the thermal barrier coating 108 burns out at the hot streak and exposes the exit 104 though a gas path surface 110 of the particular one or more self-opening cooling passages 100. Only those self-cooling passages 100 that are adjacent the hot streak H will open and thereby "self-heal".

Figure 6:
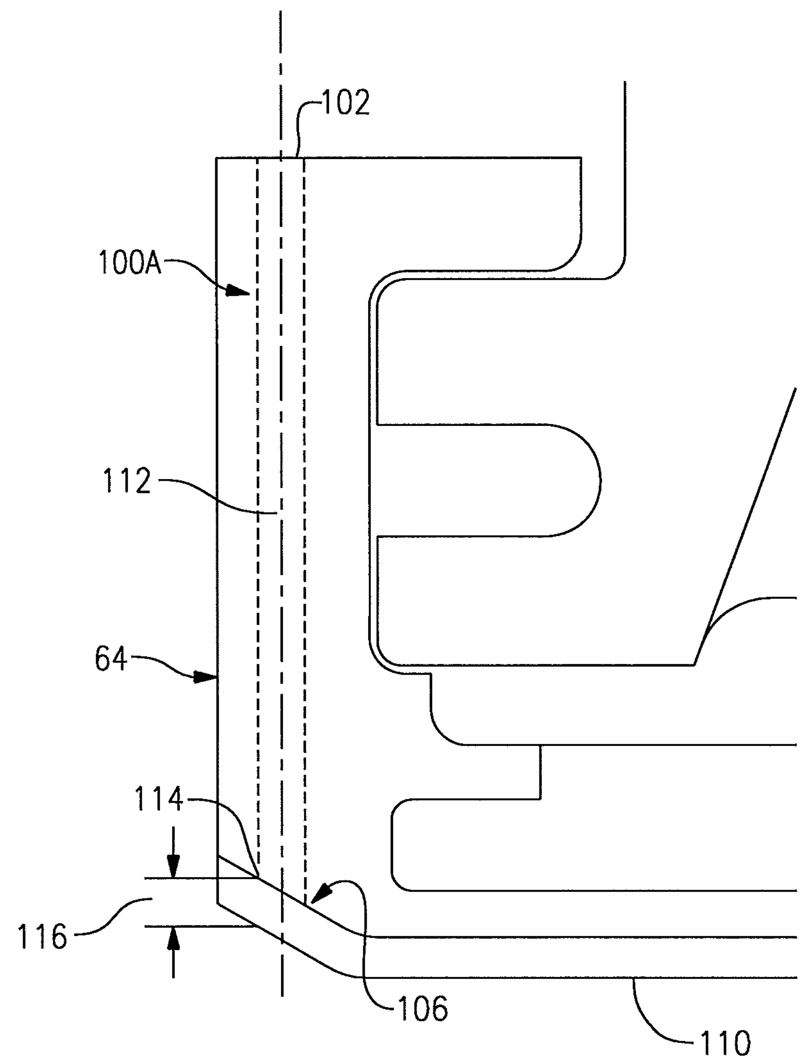
FIG. 6 is a sectional view of a shroud assembly with a blade outer air seal (BOAS) segment having a multiple of self-opening cooling passages according to another disclosed non-limiting embodiment.

With reference to FIG. 6, in another disclosed non-limiting embodiment, the barrier 106 of each of the multiple of self-opening cooling passages 100A is provided by a non-through passage 112. That is, an end 114 of each of the multiple of self-opening cooling passages 100A is displaced from the gas path surface 110 by a predefined thickness of material 116 which will burn away if located at a hot streak H. That is, the thickness of material 116 is predetermined to burn away when exposed to a predetermined temperature typical of a hot streak H.

Figure 7:
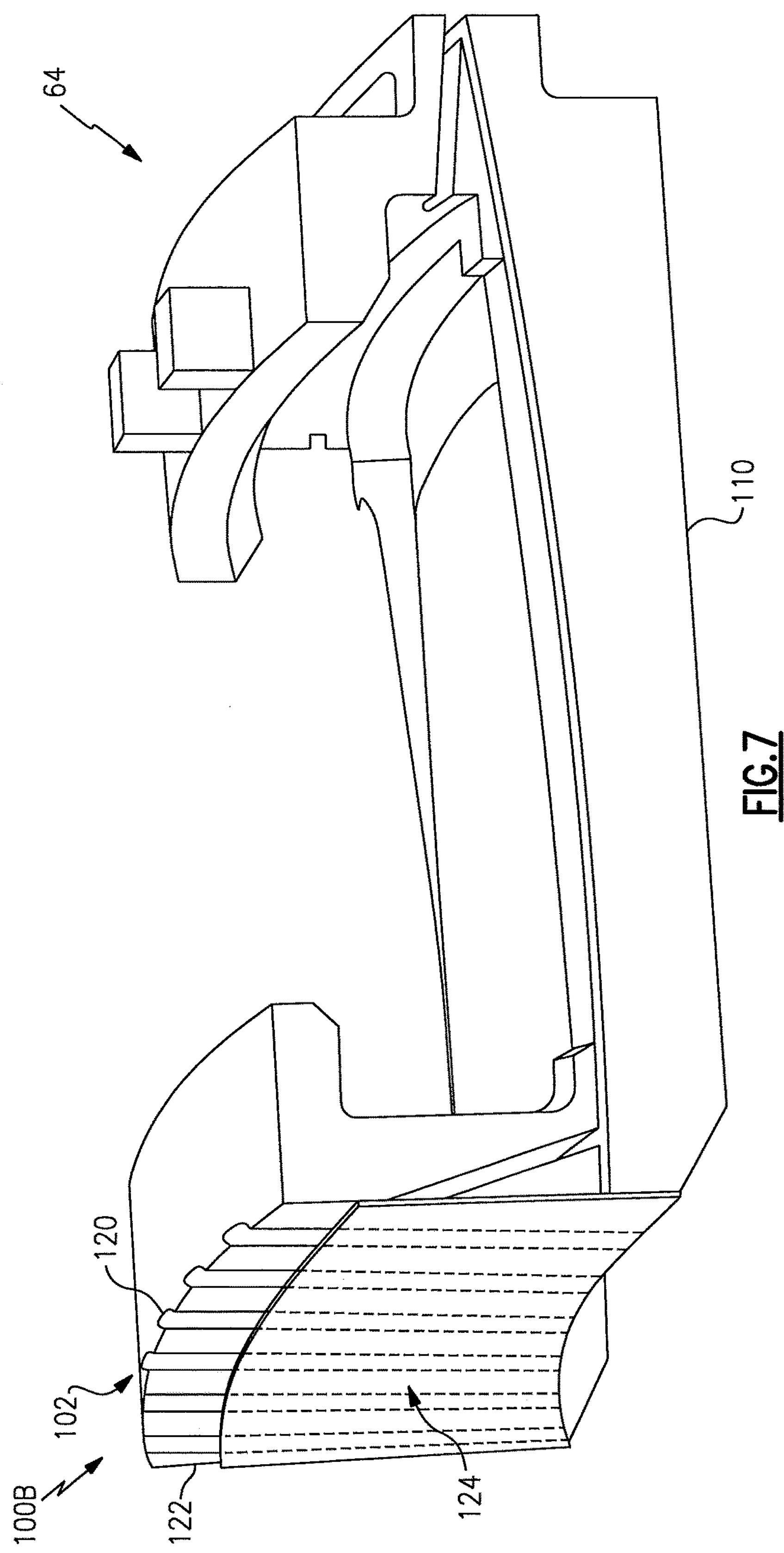
FIG. 7 is a cold side perspective view of a blade outer air seal (BOAS) segment having a multiple of self-opening cooling passages illustrated in phantom.
Figure 8:
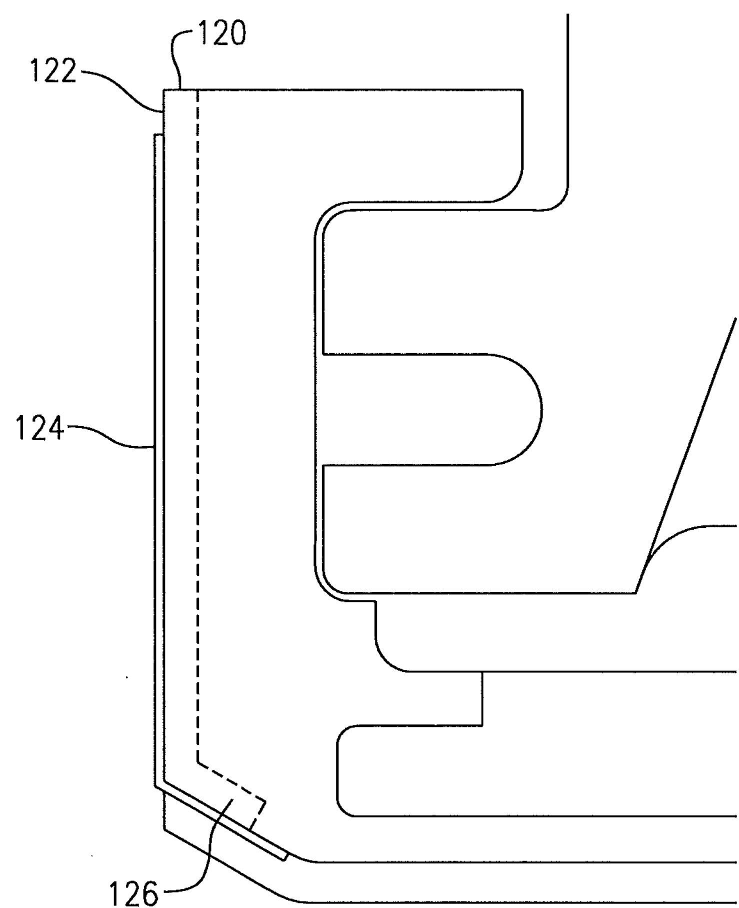
FIG. 8 is a sectional view of a shroud assembly with a blade outer air seal (BOAS) segment having a multiple of self-opening cooling passages according to one disclosed non-limiting embodiment.
Figure 9:
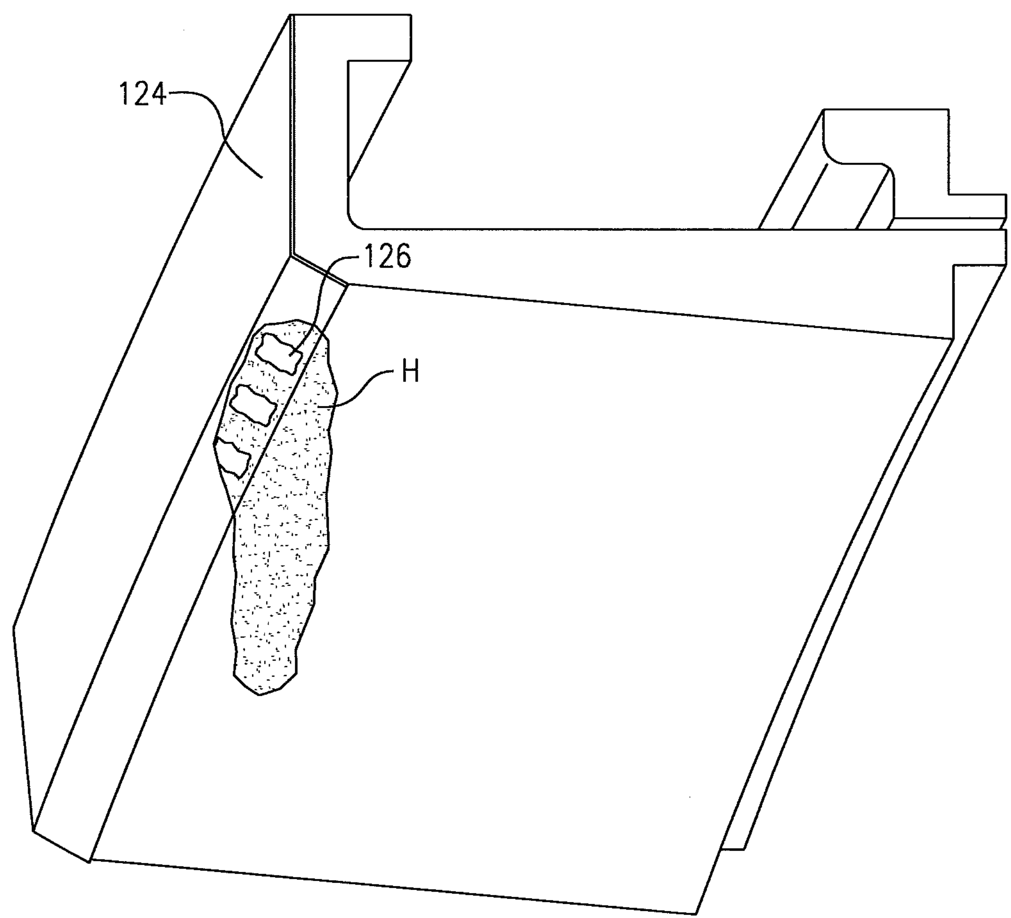
FIG. 9 is a hot side perspective view of a blade outer air seal (BOAS) segment with self-opening cooling passages opened in response to a heat streak.

With reference to FIG. 7, in another disclosed non-limiting embodiment, each of the self-opening cooling passages 100B are defined by a respective slot 120 along a leading edge 122 of the BOAS segment 64. A relatively thin metal alloy sheet 124 closes the slots 120 and exits 126 thereto (FIG. 8). The sheet 124 will locally burn away from the localized higher temperatures of the hot streak H to open one or more exits 126 (FIG. 9).

The self-opening cooling passages 100, 100A, 100B essentially "self-heal" local hot streaks H in the turbine section 28. Furthermore, the self-opening cooling passages 100, 100A, 100B facilitate the design of static turbine component 98 to an average temperature environment within the turbine section 28 rather than to the greater temperature hot streaks. The self-opening cooling passages 100, 100A, 100B also provide lower dedicated cooling flow requirements and thereby increase overall turbine section 28 efficiency.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A turbine component for a gas turbine engine comprising:

a gas path surface carried by the turbine component; and a self-opening cooling passage defined by said turbine component and communicating through said gas path surface when at least partially opened, said self-opening cooling passage having a constant cross-sectional area through the turbine component between an inlet of the self-cooling passage and an exit of the self-cooling passage, wherein said self-opening cooling passage is defined by a slot with a metal alloy sheet to enclose the slot, wherein said metal alloy sheet defines a barrier that burns away in response to a predetermined temperature to open said self-opening cooling passage to film cool the gas path surface local to the exit.

2. The component as recited in claim 1, wherein said metal alloy sheet defines a barrier that burns away in response to a heat streak to open said self-opening cooling passage.

3. The component as recited in claim 1, wherein said self-opening cooling passage is a non-through passage.

4. The component as recited in claim 3, wherein the non-through passage is displaced from a gas path surface by a predefined thickness of material that burns away in response to a predetermined temperature to open said self-opening cooling passage.

5. The component as recited in claim 3, wherein said non-through passage is displaced from a gas path surface by a predefined thickness of material that burns away in response to a heat streak to open a respective self-opening cooling passage.

6. The component as recited in claim 1, wherein the turbine component is a blade outer air seal.

7. The component as recited in claim 1, wherein the turbine component is an inner vane support.

8. The component as recited in claim 1, wherein the turbine component is an outer vane support.

9. A turbine component for a gas turbine engine comprising:

a multiple of self-opening cooling passages each of which defines a self-opening cooling passage axis that extends through a gas path surface, wherein at least one of said self-opening cooling passages has a constant cross-sectional area through the turbine component between an inlet of the self-cooling passage and an exit of the self-cooling passage, wherein said at least one of said self-opening cooling passages is defined by a slot with a metal alloy sheet to enclose the slot, wherein said metal alloy sheet defines a barrier that burns away in response to a predetermined temperature to open said at least one of said self-opening cooling passages to film cool the gas path surface local to the exit.

10. The component as recited in claim 9, wherein each of said multiple of self-opening cooling passages includes a barrier that burns away in response to a hot streak.

11. The component as recited in claim 9, wherein the turbine component is a blade outer air seal.

* * * * *